(12) United States Patent
Nakamura et al.

(10) Patent No.: US 6,247,946 B1
(45) Date of Patent: Jun. 19, 2001

(54) CARD CONNECTOR COMPRISING CONNECTOR PORTION AND SEPARATABLE CARD-RECEIVING FRAME PORTION WITH CARD EJECTOR MECHANISM

(75) Inventors: Keisuke Nakamura, Akishima; Kazushi Kamata, Hirosaki, both of (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 09/203,089

(22) Filed: Dec. 1, 1998

(30) Foreign Application Priority Data

Dec. 2, 1997 (JP) .................................... 9-331569

(51) Int. Cl.⁷ .................................................. H01R 13/62
(52) U.S. Cl. .......................... 439/159; 439/160; 361/754
(58) Field of Search .................... 439/159, 160, 439/155, 152; 361/754, 798, 727, 725, 737, 684, 686, 796, 801, 802

(56) References Cited

U.S. PATENT DOCUMENTS

| | | | |
|---|---|---|---|
| 5,492,481 | * | 2/1996 | Lewis .................................... 439/159 |
| 5,619,660 | * | 4/1997 | Scheer et al. ......................... 395/282 |
| 5,667,396 | * | 9/1997 | Pan et al. .............................. 439/160 |
| 6,059,588 | * | 5/2000 | Tung et al. ........................... 439/159 |

* cited by examiner

Primary Examiner—Khiem Nguyen
Assistant Examiner—Michael C. Zarroli
(74) Attorney, Agent, or Firm—Laff, Whitesel & Saret, Ltd.; J. Warren Whitesel (57) ABSTRACT

In a card connector comprising a plurality of contacts at a rear end portion thereof to be mounted onto a printed circuit board, a card receiving portion in front of the contacts for receiving a card to be connected to said contacts, and an ejector mechanism for ejecting said card from connection with said contacts, the contacts are mounted in a thin insulator body to form a connector portion, while the card receiving portion is formed in a rectangular cylindrical frame portion which is mounted onto the connector portion after the connector portion is mounted onto a printed circuit board. The ejector mechanism is previously assembled onto the frame portion.

3 Claims, 9 Drawing Sheets

FIG. IIB

FIG. IIA

CARD CONNECTOR COMPRISING CONNECTOR PORTION AND SEPARATABLE CARD-RECEIVING FRAME PORTION WITH CARD EJECTOR MECHANISM

BACKGROUND OF THE INVENTION

The present invention relates to an electrical connector and, in particular, to a card connector used for connection of a printed circuit board with a card, such as an IC card, a smart card, a PCMCIA card and an expansion card for an intelligent terminal such as a personal computer, a PDA (personal digital assistant), or a digital camera.

A known card connector, which is disclosed in, for example, Japanese Utility Model Unexamined Publication No. 55258/1993 (JP-U-5 55258) is an one-piece type and comprises a U-shaped insulator. The U-shaped insulator has a pair of guides opposite to each other to form a slot for receiving a card therein. The card has a mating connector and is inserted into the slot through an open front end of the U-shaped insulator. Those guides are provided with guide groove to be of U-shaped cross section, and are located opposite to each other. Pin contacts are mounted on the U-shaped insulator at a rear end portion opposite to the open front end and are brought into contact with the mating connector in the card inserted into the slot. The connector further included an ejector mechanism to eject the card from connection with the contacts. The ejector mechanism comprises an ejector rod slidably mounted on a side of the U-shaped insulator and a lever pivotally mounted on an upper surface of the rear end portion of the U-shaped insulator. The lever has a connected portion at one end thereof connected one end of the ejector rod and an engaging portion at the opposite end thereof for engaging with an edge of a card inserted into the slot. When the ejector rod is moved rearward, the lever is rotated and frontward pushes the card held in the slot to eject the card.

In this known connector, the U-shaped insulator has a pivot integrally formed into one body. The lever has a small hole in which the pivot is inserted. Then, a top end of the pivot is deformed mechanically or thermally to rotatably fix the lever onto the pivot. Therefore, a special jig is necessary for assembling the lever onto the U-shaped insulator. Furthermore, the connector does not have sufficient mechanical strength.

Further, a card supporting member or a frame for supporting the card comprises the opposite guides of substantially U-shaped cross section and, is small in the rigidity. Therefore, when the ejector rod mounted on one of the opposite guides is operated to eject the card in the slot, the frame is deformed. In consequence, the card cannot be easily removed from the slot. Furthermore, the card connector it self is relatively large and heavy. This makes it impossible to mount the card connector onto a printed circuit board by use of an automatic mounting machine.

Another known card connector is a two-piece type and comprises a base portion and an ejector portion. The base portion comprises a U-shaped insulator having the similar opposite guides and a plurality of contacts fixedly mounted at a rear portion thereof. The ejector portion comprises parts for the ejector mechanism such as the ejector rod and the lever, and a support supporting the ejector mechanism. The base portion is previously mounted onto the printed circuit board and then the ejector portion is mounted and assembled onto the base portion. Since the base portion is comparatively small in weight, it is possible to mount the card connector onto the printed circuit board by use of the automatic mounting machine.

However, the two-piece card connector still has a problem that the mounting operation by use of the automatic mounting machine is difficult because the base portion is relatively large in size and weight.

In the two-piece card connector, the lever is also pivoted at a pivot position onto the support and, therefore, comprises two lever portions at both sides of the pivot position, first one having the connected portion at the end connected to the ejector lever while the other or second one having the engaging portion at the opposite end for engaging with the card. If the second lever portion is formed relatively long, a force acts to urge the front side thereof in contact with the card upward, while the rear side not in contact with the card is urged downward. Consequently, the second lever portion is deformed. This may make it difficult to use the connector.

SUMMARY OF THE INVENTION

It is an object of the present invention to provide a card connector of a two-piece type which can be easily mounted on a printed circuit board with an automatic mounting machine.

It is another object of the invention to provide a card connector of a two-piece type which has a rigidity for holding a card stable therein.

It is another object to provide a card connector of a two-piece type wherein a lever of an ejector mechanism has a high rigidity without increase of size of the card connector.

The present invention is applicable to a card connector for electrically connecting a card including a mating connector having a plurality of mating contacts to a printed circuit board.

According to the present invention, the card connector comprises: a connector portion comprising a base insulator having a front surface, an upper surface, a bottom surface and a rear surface, and a plurality of contacts fixed to the base insulator, each of the plurality of contacts comprising a contact portion protruding from the front surface to be brought into contact with the corresponding one of the mating contacts and a terminal portion protruding from one of the bottom surface and the rear surface for making an electrical connection with the printed circuit board; a frame portion mounted onto the connector portion and having an upper wall, a lower wall, and opposite side walls to form a rectangular cylinder for receiving the card therein, the upper wall having a rear extension portion extending rearward to overlie the upper surface of the base insulator when the frame portion is assembled onto the connector portion; and an ejector mechanism assembled on the frame portion for ejecting the card from an electrical connection between the connector portion and the mating connector, the ejector mechanism comprising an ejector rod slidably mounted and guided onto one of the side walls of the frame portion and a lever pivotally mounted by a pivot onto the rear extension portion of the upper wall, the lever having an end as a card engaging end for engaging with the card received in the frame portion and an opposite end connected to the ejector rod, the lever being pivotally moved in response to movement of the ejector rod to thereby push the card frontward.

In one embodiment of the card connector, the upper wall has a lower surface and the lever is made of a plate and pivotally mounted onto the lower surface so as to be rotatable in the plane of the plate. The lever plate comprises a plate portion extending between the pivoted portion and the opposite portion and the remaining plate portion extending between the pivoted portion and the card engaging portion. The lever plate has a bent front side comprising a first generally linear front side along the plate portion and a second generally linear front side along the remaining plate portion so that the remaining plate portion has a projecting part frontward projecting from an extension line of the first generally linear front side.

In one embodiment of the card connector, if the card having a side surface in which a key groove is formed, one of the opposite side walls of the frame portion has an inner key corresponding to the key groove so as to prevent the card from being inserted into the frame portion in an erroneous orientation.

In the card connector of the present invention, the ejector mechanism is previously assembled onto the frame portion. The frame portion having the ejector mechanism is mounted on the connector portion after the connector portion is mounted onto the printed circuit board.

DESCRIPTION OF THE PREFERRED EMBODIMENTS

To better understand the present invention, known card connectors in the prior art will firstly be described.

Figure 1:
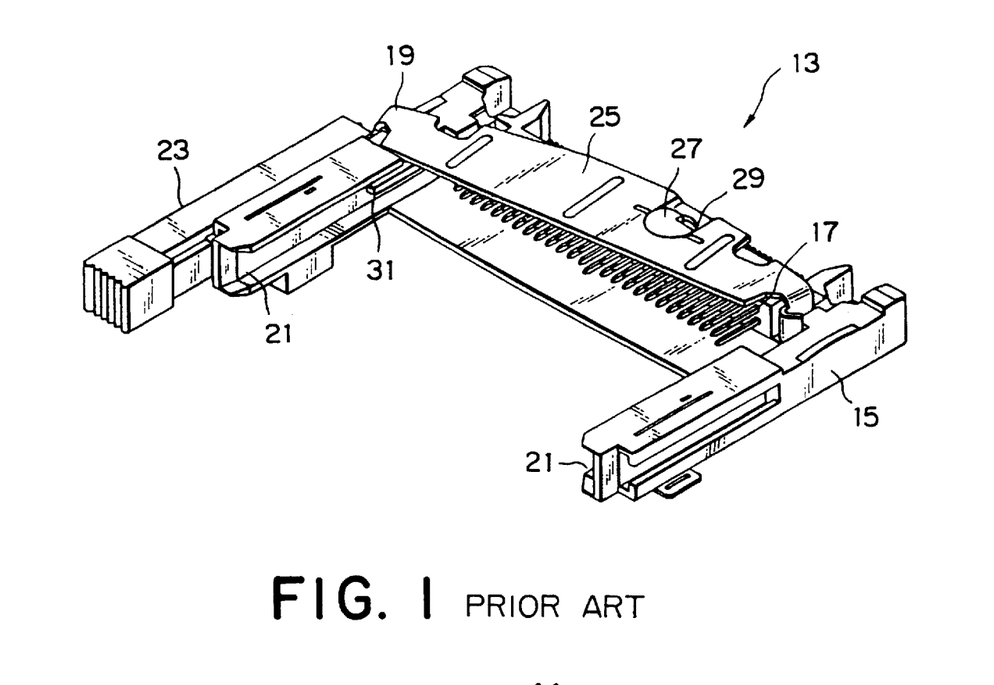
FIG. 1 is a perspective view of a prior art one-piece card connector.

Referring to FIG. 1, the card connector of one-piece type shown therein, is generally indicated by reference numeral 13, and comprises a U-shaped insulator 15, pin contacts 17 mounted at a rear end portion of the insulator 15, and an ejector mechanism 19 for ejecting the card (not shown) held in the card connector. The U-shaped insulator 15 has a pair of guides 21 to form a slot for receiving the card. The guides 21 are of U-shaped cross section and have guide grooves opposite to each other so as to guide the card inserted into the slot. The ejector mechanism 19 comprises an ejector rod 23 and a lever 25. The ejector rod 23 is mounted at an outside of one of the guides 21 of the U-shaped insulator 15 (which will merely be referred to as "insulator 15"). The lever 25 connects with one end of the ejector rod 23. In detail, the lever 25 is formed with a small hole 29 and the insulator 15 has a pivot 27 integrally with the insulator. The lever 25 is rotatably mounted onto the insulator 15 by inserting the pivot 27 into the hole 29 and deforming a top of the pivot 27 mechanically or thermally with a jig. As the ejector rod 23 moves forwardly or rearwardly, the lever 25 rotates about the pivot 27.

In the guide groove of one of the guides 21, a key 31 is formed corresponding to a keygroove formed in one side surface of the card (not shown) so as to prevent the card being inserted into the slot with erroneous orientation.

The known card connector of a one-piece type has a problem as described in the preamble.

Figure 2:
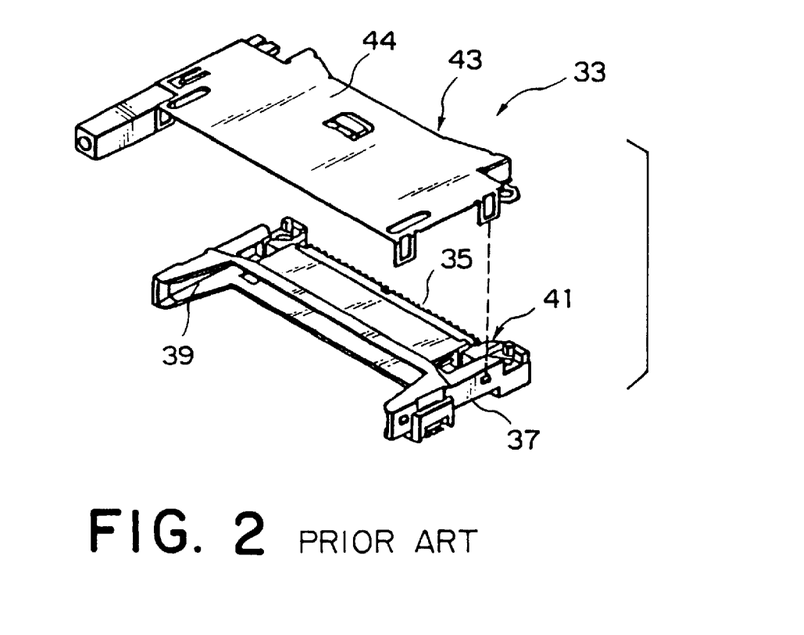
FIG. 2 is a perspective view of a prior art two-piece card connector.

Referring to FIG. 2, the known two-piece card connector shown therein is generally indicated by reference numeral 33. This card connector 33 comprises two separate subassemblies, i.e., a base portion 41 and an ejector portion 43. The base portion 41 comprises pin contacts 35, a U-shaped insulator 37 holding the pin contacts 35. The insulator 37 has a pair of guides 39 for guiding the card. The guides 39 are of substantially U-shaped cross section and opposite to each other to define a card insertion slot for permitting insertion of a card. The ejector portion 43 comprises the ejector mechanism.

Figures 3A, 3B:
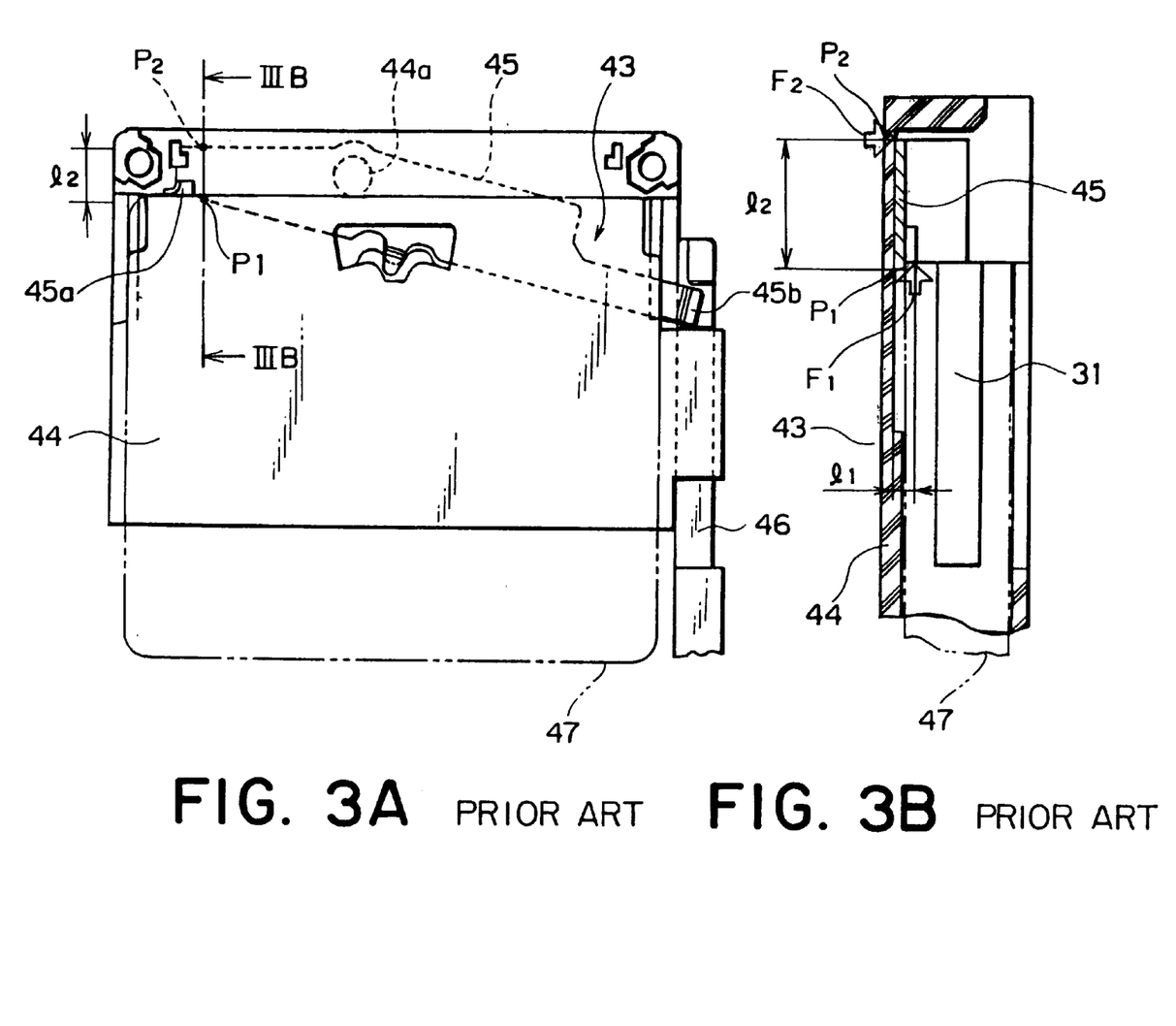
FIG. 3A is a plan view of the prior art two-piece card connector shown in FIG. 2.
FIG. 3B is a cross-sectional view taken along a line IIIB—IIIB in FIG. 3A.

Referring to FIGS. 3A and 3B in addition to FIG. 2, the ejector portion 43 comprises a support 44 and the ejector mechanism comprising a lever 45 and an ejector rod 46 supported on the support 44. The support 44 has a pivot 44$a$ on which the lever 45 is rotatably mounted. The lever 45 has an engaging portion 45$a$ at one end thereof for engaging the card 47 inserted in to the slot and a connected portion 45$b$ at the opposite end thereof which is connected to the ejector rod 46. The ejector portion 43 is previously assembled before it is assembled onto the base portion 41.

This two-piece card connector 33 is mounted to a printed circuit board by mounting the base portion 41 by use of an automatic mounting machine onto the printed circuit board, thereafter soldering the base portion to the board by a reflow process, and then assembling the ejector portion 43 onto the base portion 41.

Referring to FIGS. 3A and 3B, providing that P1 and P2 are positions on the front and rear sides of a portion of the lever 45 adjacent the engaging portion 45$a$, respectively, let F1 and l1 be a force in the direction of insertion of the card 47 at P1 and a distance from the card 47 to P1, respectively. Let F2 and l2 be a force in the vertical direction at a point P2 and a horizontal distance between P1 and P2, respectively. The following relation is given:

$$F1 \times l1 = F2 \times l2 \qquad (1)$$

That is, as the horizontal distance l2 increases, the force F2 increases. This increases a possibility that the lever 45 is urged upward at P1 and downward at P2 in relation to a surface of the lever 45. That is, the lever 45 is deformed. Since the lever 45 is located rearward in relation to the card 47 inserted in the slot, the deformation easily occurs.

The known two-piece card connector has the problem as also described in the preamble.

The preferred embodiments of the present invention are next described with reference to the accompanying drawings.

Referring to FIGS. 4, 5, 6A and 6B, the card connector 51 shown therein is one according to a first embodiment of the present invention and comprises a frame portion 53 and a connector portion 55 that is mounted at a rear part of the frame portion 53.

The frame portion 53 comprises a hollow body 59 of a rectangular tubular cross section having a front opening 57 through which a card is inserted into the hollow body 50. The hollow body 59 comprises an upper wall 69, a lower wall and opposite side walls for connecting the upper and lower walls to form the rectangular tubular body. The upper wall 69 has a rear extension portions 69a which extends rearward to overlie the upper surface of a base insulator 79, when the frame portion 53 is assembled on to the connector portion 55. The frame portion 53 is provided with an ejector mechanism assembled onto the hollow body. 59. The ejector mechanism comprises an ejector rod 63 slidably mounted on one side wall, a button 65 formed at one end of the ejector rod 63, and a lever 67 pivotally mounted on the upper wall and connected to the rod 63. The lever 67 has a connected portion at one end thereof connected to a top end of the ejector rod 63, and an engaging portion 99 at the opposite end thereof for engaging an edge of the card 47 inserted into the hollow body 59.

Figure 6A:
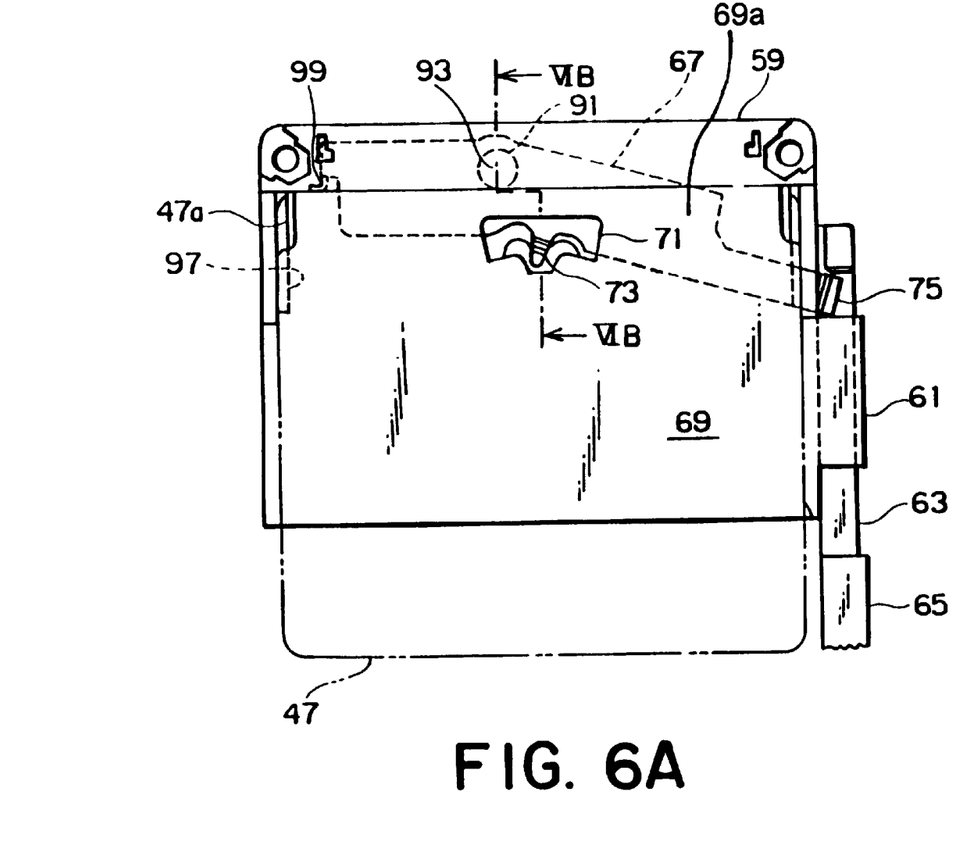
FIG. 6A is a plan view of the card connector shown in FIG. 5.

As shown in FIG. 6A clearly, the upper wall of the hollow body 59 is provided with a pivot 93 on an inner surface of the upper wall 69. The lever 67 is provided with a hole 91 in which the pivot 93 is inserted to rotatably hold the lever 67. The upper wall 69 is formed with a hole 71 at a position forward from the pivot 93. The hole 71 is accompanied with a thin edge wall portion 95 at its front edge. The lever is provided with a tongue 73 which frontward extending from a front side thereof. The tongue 73 extends onto the thin edge wall portion 95 through the hole 71 and is slidable on the thin edge wall portion 95 when the lever 67 rotates about the pivot 93. Since the lever 67 is hold on the frame portion 53 by engagement of the hole 91 with the pivot 93 and engagement of the tongue 73 with the thin edge wall portion 95, it is prevented from falling off from the frame portion 53.

Figure 4:
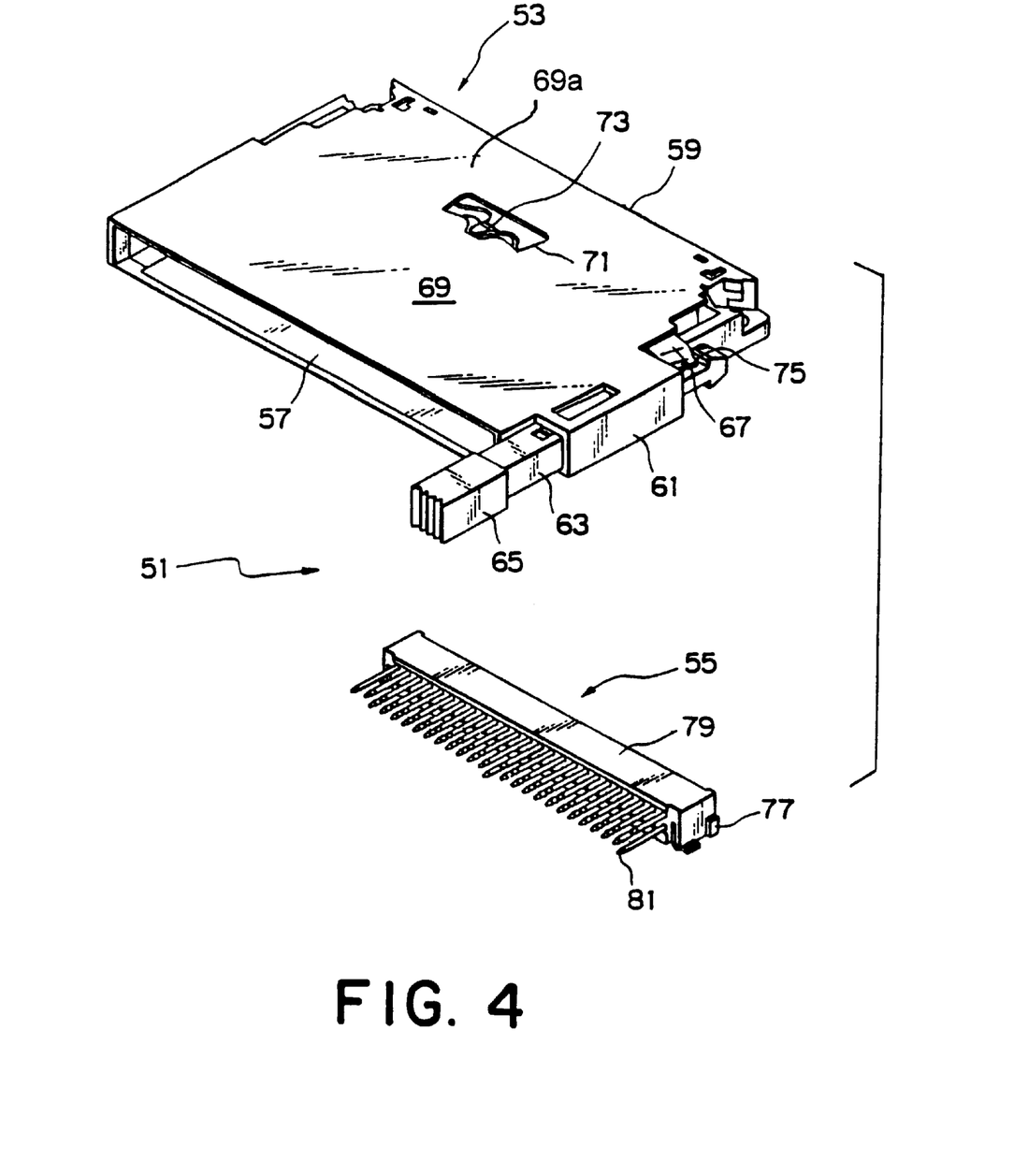
FIG. 4 is an exploded perspective view of a card connector according to an embodiment of this invention.
Figure 5:
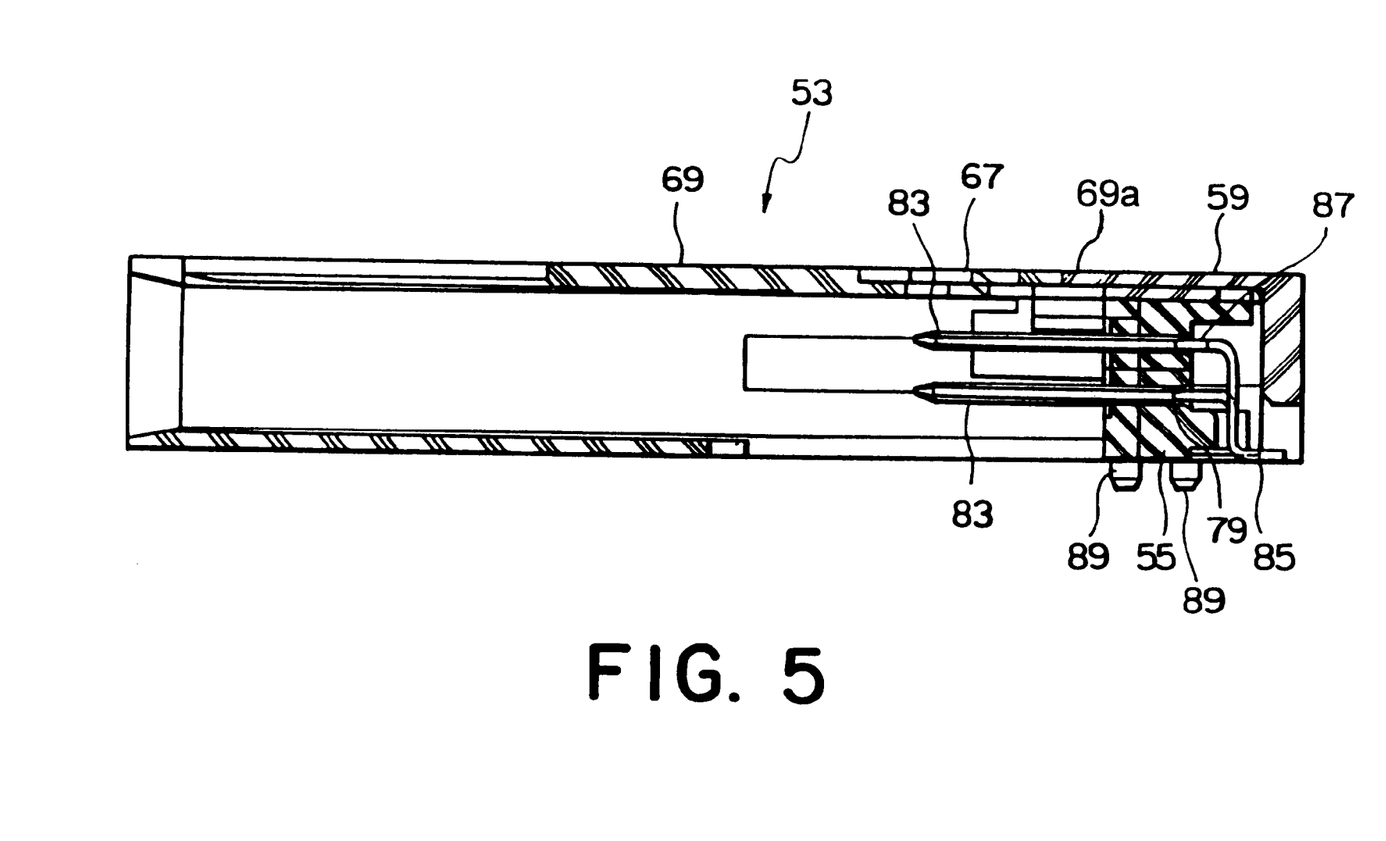
FIG. 5 is a cross-sectional view of the connector shown in FIG. 4 in an assembled condition.

The connector portion 55 has a rectangular rod-shape insulator (which will merely be referred to as "insulator") 79 and a plurality of pin contacts 81 implanted in the insulator 79. The insulator 79 has protrusions 77 on both sides to permit the insulator to be mounted to the frame portion 53. Each of the pin contacts 81 comprises a contact portion 83, a terminal portion 85 to be bonded to a printed circuit board by soldering, and a fixing portion 87 fixed to the insulator 79. When the card 47 is inserted, the contact portion 83 of each of the contacts 81 comes into contact with the corresponding one of mating contacts of a mating connector in the card 70.

The connector portion 55 is provided with positioning pins 89 which are inserted into positioning holes (not shown) formed in the printed circuit board to place and hold the connector portion 55 in position.

Figure 6B:
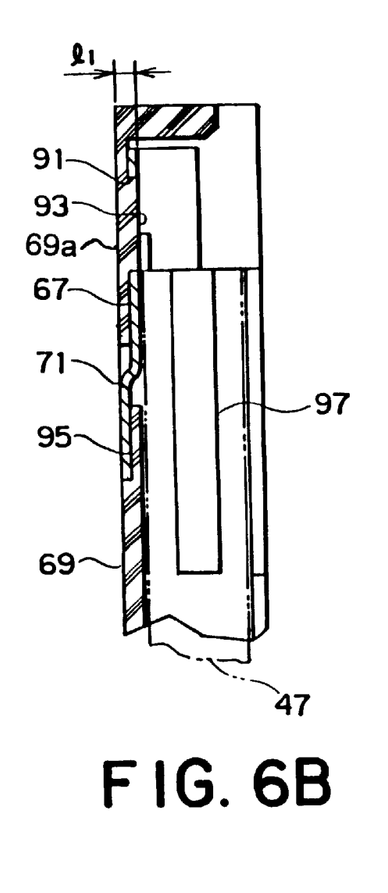
FIG. 6B is a cross-sectional view taken along a line VIB—VIB in FIG. 6A.

The frame portion 53 is provided with a key 97 as shown in FIGS. 6A and 6B for guiding the key groove 47a formed in the side surface of the card.

The connector portion 55 is comparatively reduced in size and weight and is also simple in shape to be easy to be handled by the mounting machine. Therefore, the connector portion 55 can at first be mounted onto a printed circuit board by use of the automatic mounting machine.

When mounting the card connectors on printed circuit boards by use of the automatic mounting machine, the connector portions 55 are held on a tray or embossed tape and supplied to the machine. Thus, the connector portion is mounted onto the printed circuit board. Then, the terminal portions 85 are soldered by a reflow process. Thereafter, the frame portion 53 is screwed or otherwise fixed to the connector portion 55 mounted on the printed circuit board. Thus, the card connector is finally mounted onto the printed circuit board.

When the card 47 is desired to be used, the card is inserted into the hollow body 59 through the front opening 57. Since the frame portion 53 is of rectangular tubular cross section, it has an increased strength so that it can hold the card stable.

Referring to FIGS. 7, 8A, 8B and 8C, the lever 67 is a generally flat plate member and provided with the engaging portion 99, connected portion 75 and the hole 91 at a position in the vicinity of its center. Therefore, the lever 67 comprises a plate portion extending between the hole 91 or a pivoted portion and the connected portion 75 and the remaining plate portion extending between the hole 91 and the engaging portion 99. The lever 67 has a bent front side comprising a first generally linear front side along the plate portion and a second generally linear front side along the remaining plate portion, so that the remaining plate portion has a projecting part 101 frontward projecting from an extension line (which is shown by a two-dot and dash line) of the first generally linear front side. Therefore, the lever 67 is wider than a conventional lever in card connectors as shown in FIGS. 1 to 3b at a portion adjacent the engaging portion 99.

Figure 7:
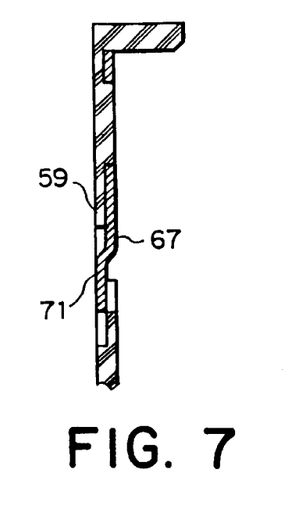
FIG. 7 is a cross-sectional view partially illustrating a frame portion of the card connector shown in FIG. 5 to which a lever is mounted.
Figure 8A:
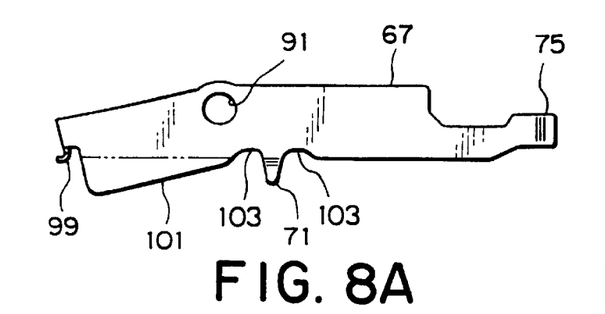
FIG. 8A is a plan view of the lever of the card connector shown in FIG. 7.
Figure 8B:
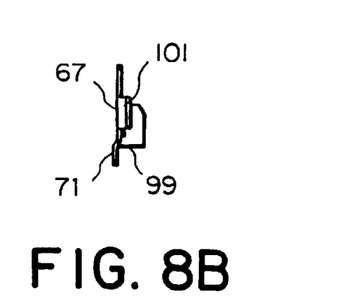
FIG. 8B is a front elevation of the lever shown in FIG. 8A.
Figure 8C:
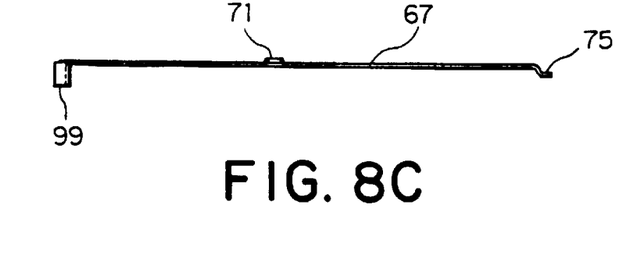
FIG. 8C is a side elevation of the lever shown in FIG. 8A.

The tongue 71 frontward protrudes in parallel to the triangular portion 101. Recesses 103 are formed in both sides of the tongue 71. When the lever 67 is mounted on the hollow body 59, the tongue 71 protrudes from the top surface 69 as shown in FIG. 7.

Figures 9A, 9B:
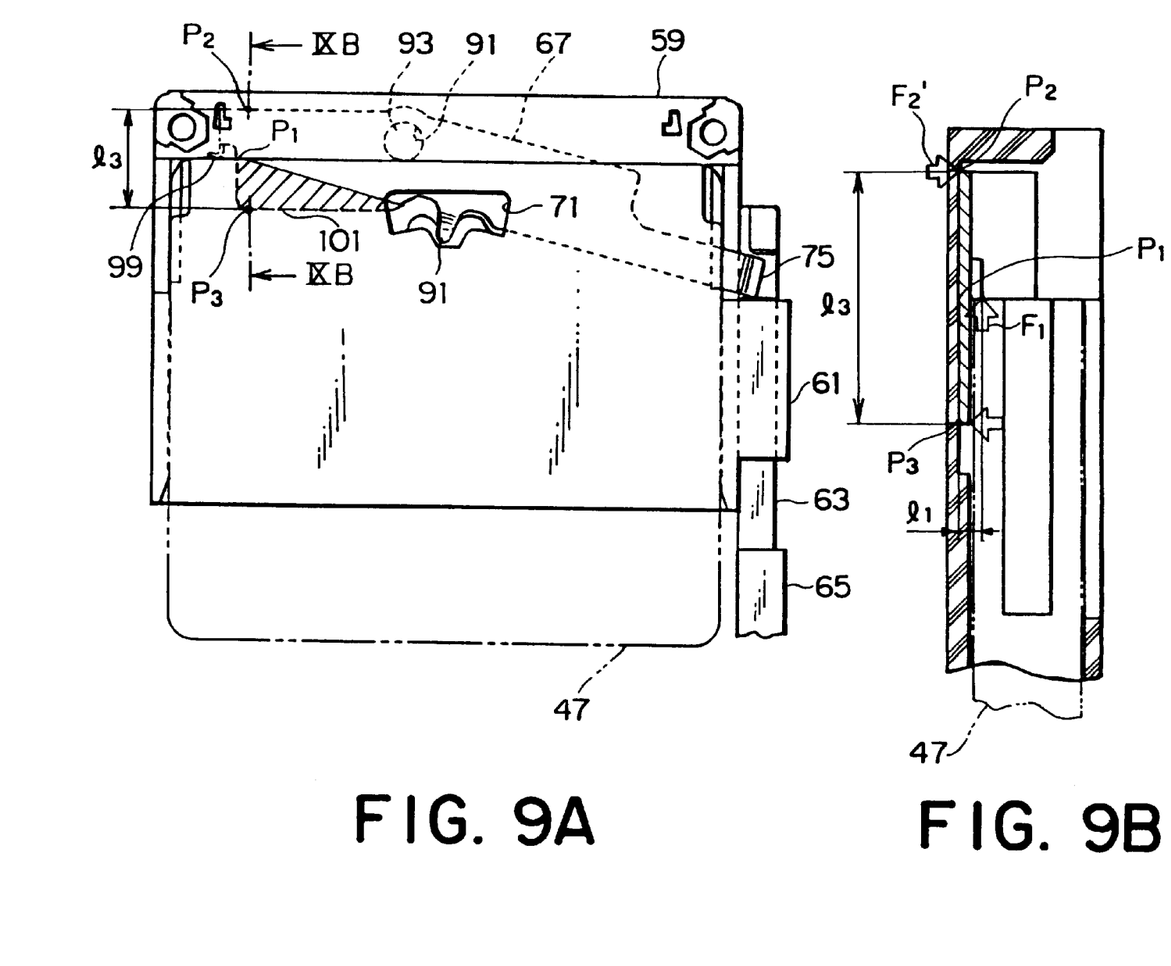
FIG. 9A is a view similar to FIG. 6A but with size and forces being written therein to for describing effect of the forces.
FIG. 9B is a cross-sectional view taken along a line IXB—IXB in FIG. 9A.
Figure 10:
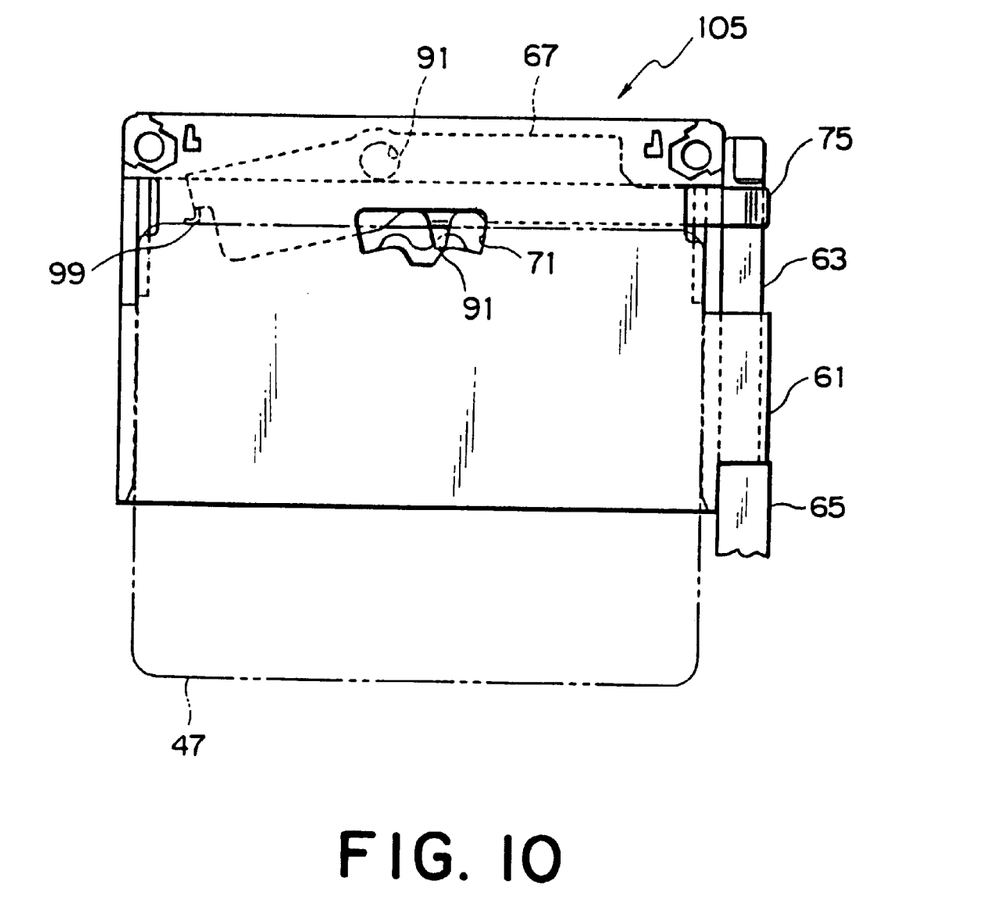
FIG. 10 is a plan view of the card connector shown in FIGS. 4 to 8C, but the card being ejected.

Referring to FIGS. 9A, 9B and 10, the lever 67 is located on the opposite side of the hole 91 from the ejector rod 63, the lever 67 rotating about the hole 91. This lever 67 is wider than the prior art lever by an area equal to the triangular portion 101 and has a uniform width.

Referring to FIGS. 9A and 9B, providing that P1 and P2 are positions on the front and rear sides of a portion of the lever 67 adjacent the engaging portion 99, respectively, in the absence of the triangular portion 101, and that P3 is a position on the front side of the rectangular portion 101 adjacent the engaging portion 99, let F1 and 11 be a force in the direction of insertion of the card 47 at P1 and a distance from the card 47 to P1, respectively. Let F'2 and 13 be a force in the vertical direction at a point P2 and a horizontal distance between P1 and P3, respectively. The following relation is given in connection with moments around P3:

$$F1 \times 11 = F'2 \times 13 \tag{2}$$

This equation is rewritten into the following by use of equation (1):

$$F2 \times 12 = F'2 \times 13$$

$$F'2 = (12/13) \times F2 \tag{3}$$

Since 13 is larger than 12, F'2 is smaller than F2.

It can be seen that deformation caused by insertion of the card is decreased by presence of the triangular portion 101 in the lever 67.

As shown in FIG. 10, when the card 47 should be ejected, the button 65 is pushed rearward. This presses the ejector rod 63 inward. The engaging portion 99 of the lever 67 rotates to the left about the pivot 93. The engaging portion 99 pushes the card 47 frontward to thereby eject the card from an electrical connection with the connector portion 55.

Description will be made as to another embodiment of the invention.

Figure 11A:
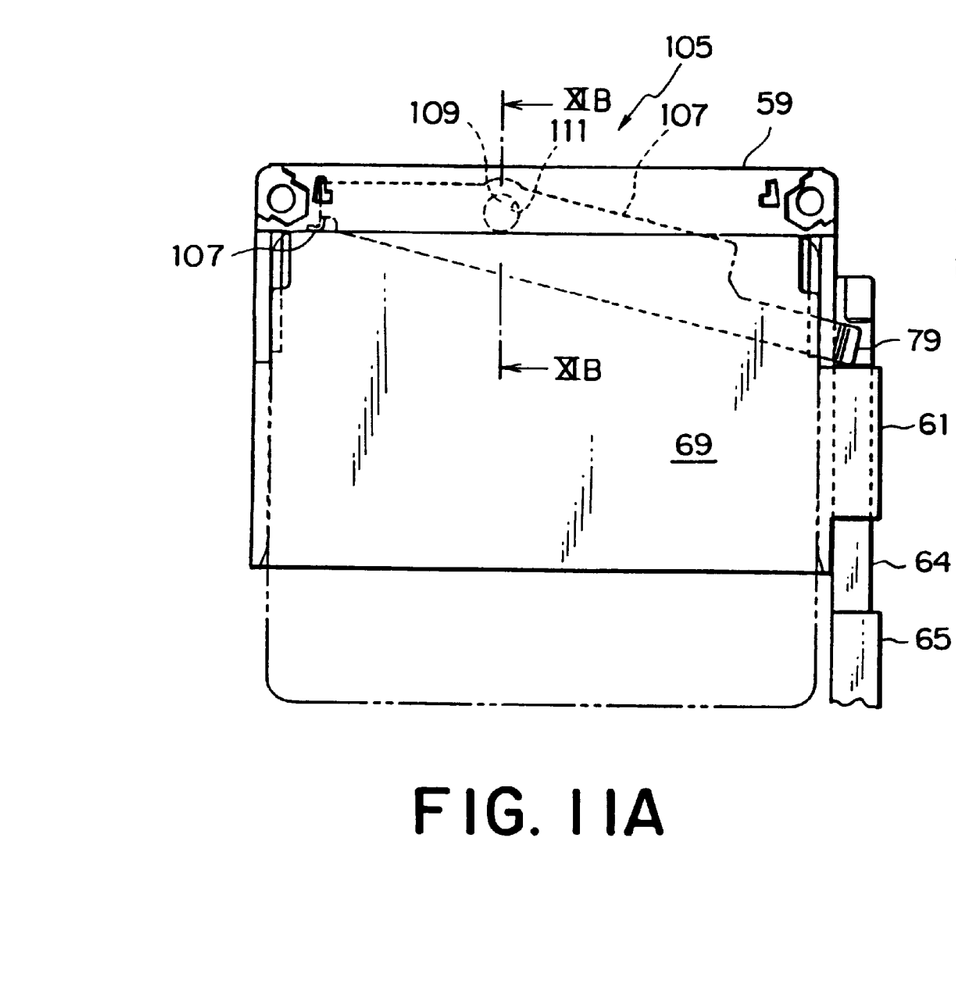
FIG. 11A is a plan view of another card connector according to another embodiment of this invention.
Figure 11B:
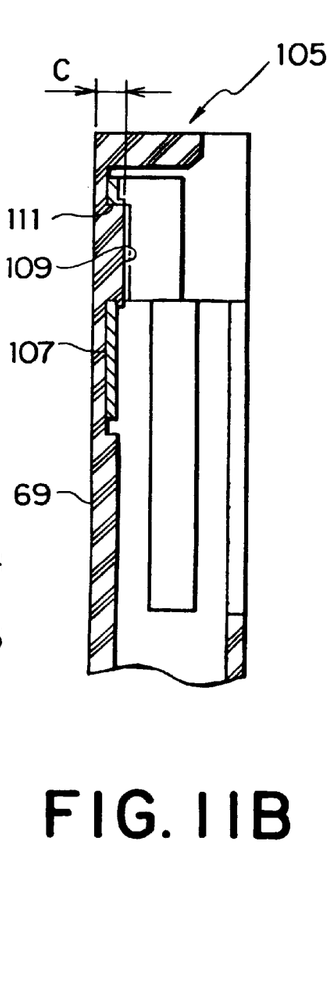
FIG. 11B is a cross-sectional view taken along a line XIB—XIB in FIG. 11A.

Referring to in FIGS. 11A and 11B, another card connector shown therein of the invention is indicated by 105. This card connector 105 is similar in structure with the card connector shown in FIGS. 4 to 9B except that a lever 107 of the ejector mechanism has neither tongue nor triangular portion. A protrusion 109 is formed on the underside of the upper wall 69 of the hollow body 59 and is inserted in a hole 111 of the lever 107.

According to the present invention, the portion directly soldered or otherwise mounted to a printed circuit board is limited to the connector portion, as described in the embodiments above. In consequence, the card connector can be easily mounted to the printed circuit board. More specifically, the connector portion is decreased in size and weight. Therefore, the number of connectors that can be packaged per unit area of the tray or embossed tape for supplying connectors into the automatic mounting machine can be increased. Furthermore, the printed circuit board on which the card connector is mounted can be reduced in size. In addition, a decrease in size of the connector portion reduces the thermal capacity of the connector portion. In consequence, the card connector can be easily soldered to the printed circuit board. Moreover, the card connector can be assembled by a reduced number of assembling steps which results in a reduced production cost. Further, the cross section of the frame portion is in a rectangular cylindrical shape. This can increase the structural rigidity of the frame portion. The size and weight of the card connector can be reduced accordingly.

What is claimed is:

1. A card connector for electrically connecting a card including a mating connector having a plurality of mating contacts to a printed circuit board, which comprises:

a connector portion comprising a base insulator having a front surface, an upper surface, a bottom surface and a rear surface, and a plurality of contacts fixed to said base insulator, each of said plurality of contacts comprising a contact portion protruding from said front surface to be brought into contact with said corresponding one of said mating contacts and a terminal portion protruding from one of said bottom surface and said rear surface for making an electrical connection with said printed circuit board;

a frame portion mounted onto said connector portion and having an upper wall, a lower wall, and opposite side walls to form a rectangular tube for receiving said card therein, said upper wall having a rear extension portion extending rearward to overlie said upper surface of said base insulator when said frame portion is assembled onto said connector portion; and an ejector mechanism assembled on said frame portion for ejecting said card from an electrical connection between said connector portion and said mating connector, said ejector mechanism comprising an ejector rod slidably mounted and guided onto one of said side walls of said frame portion and a lever pivotally mounted by a pivot onto said rear extension portion of said upper wall, said lever having an end as a card engaging end for engaging with said card received in said frame portion and an opposite end connected to said ejector rod, said lever being pivotally moved in response to movement of said ejector rod to push said card frontward, said card having a side surface in which a key groove is formed, wherein one of said opposite side walls of said frame portion has an inner key corresponding to said key groove so as to prevent said card from being inserted into said frame portion in an erroneous orientation.

2. A card connector as claimed in claim 1, wherein:

said upper wall has a lower surface, said lever is made of a plate and pivotally mounted onto said lower surface so as to be rotatable in the plane of said plate, and said lever plate comprises a plate portion extending between said pivoted portion and said opposite portion and another plate portion except for a plate portion between said pivoted portion and said card engaging portion, said lever plate has a bent front side comprising a first generally linear front side along said plate portion and a second generally linear front side along said other plate portion so that said other plate portion has a projecting part frontwardly projecting from an extension line of said first generally linear front side.

3. A card connector as claimed in claim 1, wherein said ejector mechanism is previously assembled onto said frame portion, and said frame portion having said ejector mechanism is mounted on said connector portion after said connector portion is mounted onto said printed circuit board.

* * * * *

UNITED STATES PATENT AND TRADEMARK OFFICE
CERTIFICATE OF CORRECTION

PATENT NO. : 6,247,946 B1　　　　　　　　　　　　　　　　　　　　Page 1 of 1
DATED : June 19, 2001
INVENTOR(S) : Nakamura et al.

It is certified that error appears in the above-identified patent and that said Letters Patent is hereby corrected as shown below:

Column 4,
Line 55, delete "11" and insert -- ℓ1 --
Line 57, delete "12" and insert -- ℓ2 --
Line 60, delete "F1x11=F2x12" and insert -- F1xℓ1=F2xℓ2 --
Line 61, delete "12" and insert -- ℓ2 --

Column 5,
Line 13, delete "50" and insert -- 59 --
Line 40, delete "hold" and insert -- held --
Line 55, delete "70" and insert -- 47 --

Column 6,
Line 47, delete "11" and insert -- ℓ1 --
Line 49, delete "13" and insert -- ℓ3 --
Line 53, delete "F1x11=F'2x13" and insert -- F1xℓ1=F'2xℓ3 --
Line 57, delete F2x12=F'2x13" and insert -- F2xℓ2=F'2xℓ3 --
Line 59, delete "F'2=(12/13)xF2" and insert -- F'2=(ℓ2/ℓ3)xF2 --
Line 61, delete "13" and insert -- ℓ3 --
Line 61, delete "12" and insert -- ℓ2 --

Signed and Sealed this

Sixth Day of August, 2002

Attest:

JAMES E. ROGAN
Attesting Officer　　　Director of the United States Patent and Trademark Office